United States Patent [19]

Merry

[11] 3,935,695
[45] Feb. 3, 1976

[54] NON-MARKING LAWN MOWER
[76] Inventor: Richard C. Merry, Box 153, Oakville, Ontario, Canada
[22] Filed: May 2, 1974
[21] Appl. No.: 466,162

[52] U.S. Cl. .................... 56/13.4; 56/249; 56/294
[51] Int. Cl.² .................................... A01D 35/24
[58] Field of Search .......... 56/13.3, 11.5, 13.4, 156, 56/249, 294; 37/43 D, 43 E, 43 H

[56] References Cited
UNITED STATES PATENTS

| | | | |
|---|---|---|---|
| 2,487,927 | 11/1949 | Isaacs | 56/17.4 |
| 2,509,343 | 5/1950 | Henderson | 56/294 |
| 2,566,724 | 9/1951 | Heil | 56/11.5 |
| 2,619,786 | 12/1952 | Ream | 56/256 |
| 2,640,309 | 6/1953 | Benson | 56/294 |
| 3,054,247 | 9/1962 | Roesler | 56/13.4 |
| 3,673,773 | 7/1972 | Ferguson | 56/13.3 |
| 3,783,592 | 1/1974 | Schraut | 56/13.3 |

*Primary Examiner*—Russell R. Kinsey
*Attorney, Agent, or Firm*—J. Richard Cavanagh

[57] ABSTRACT

The following disclosure sets forth a non-marking lawn mower in which a cutter cylinder carrying multiple disc blower cutters in a centrifugal blower structure is supported in parallel spaced relation to a rearward roller structure which carries the mower. The drive motor rotates the cylinder at a cutter speed greater than 6,000 feet per minute. At least one forward adjusting roller can be positioned to determine the height of cut effected by the cutter cylinder.

5 Claims, 10 Drawing Figures

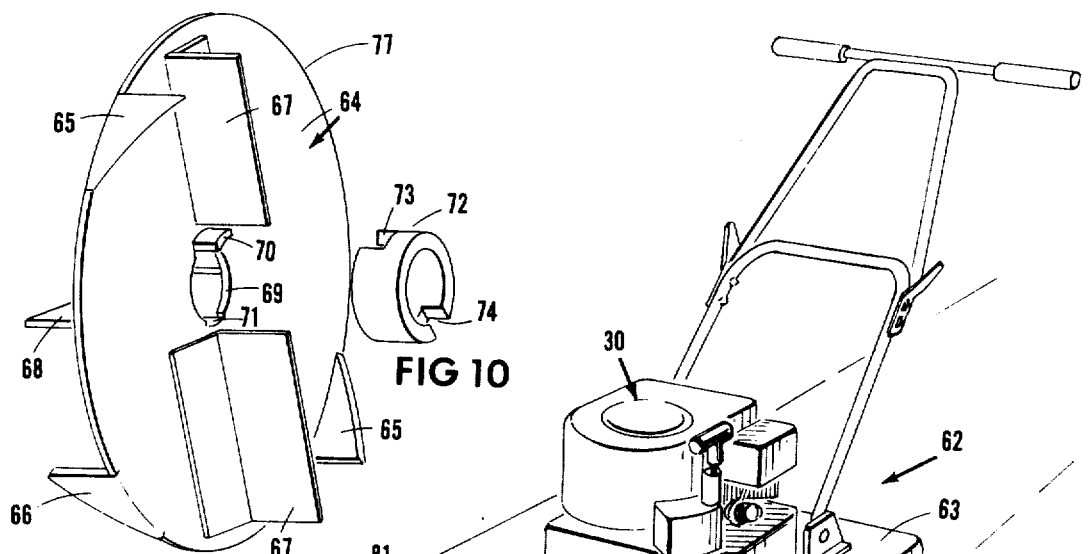
FIG 10
FIG 8
FIG 6
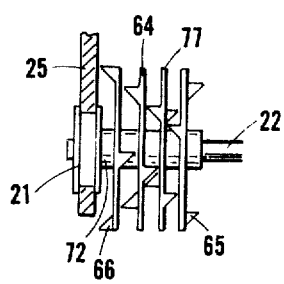
FIG 9
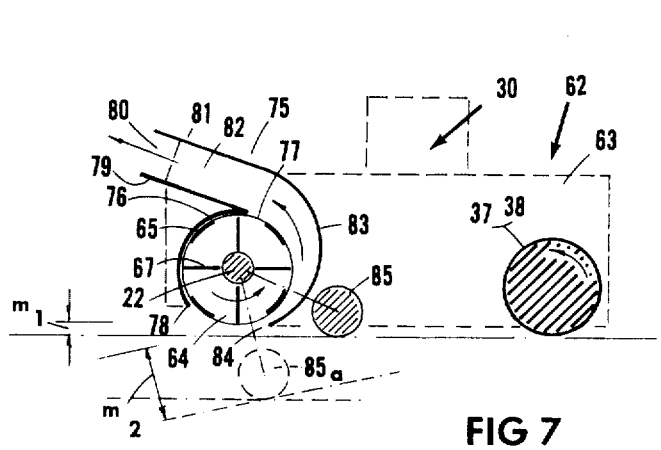
FIG 7

NON-MARKING LAWN MOWER

This invention relates to a lawn mower adapted to cut lawn grass in such manner that the track or path of the cut is not revealed on the lawn surface.

In the state of the art of rotary blade lawn mowers the grass is cut over one half of the path of cut in a direction opposite to the adjacent half of an adjacent path of cut. Thus, though the grass may be cut to the same height in each path the contrast in cut direction will give the appearance of a line. Furthermore the wheels of such a mower mark the path of cut.

With a reel type shear cutting lawn mower, when the successive cutting paths are in the same direction the separate cutting paths cannot be detected except by wheel marks. However, the necessity of specially sharpening reel type shear mower blades has led to this class of lawn mower being replaced by rotary blade type mowers for general use.

It is an object of the invention to provide a flying cutter cylinder type mower having the advantages of both shear reel and rotary mowers and adapted to effect a lawn cut without leaving wheel marks or the like.

Other objects of the invention will be appreciated by a study of the following specification taken in conjunction with the accompanying drawings.

IN THE DRAWINGS:

FIG. 6 is a perspective view of a modified mower of the invention;

FIG. 7 is a diagrammatic section of the modified mower of FIG. 6;

FIG. 8 is an enlarged perspective view of a blower disc cutter for use with the mower of FIG. 6;

FIG. 9 is a plan view of a portion of the cutter cylinder formed by axially stacking blower cutter discs of the kind shown in FIG. 8;

FIG. 10 is an enlarged perspective view of a drive locking spacer or mounting cutter located between the blower cutter discs in FIG. 9.

Figures 1, 2, 3, 4, 5:
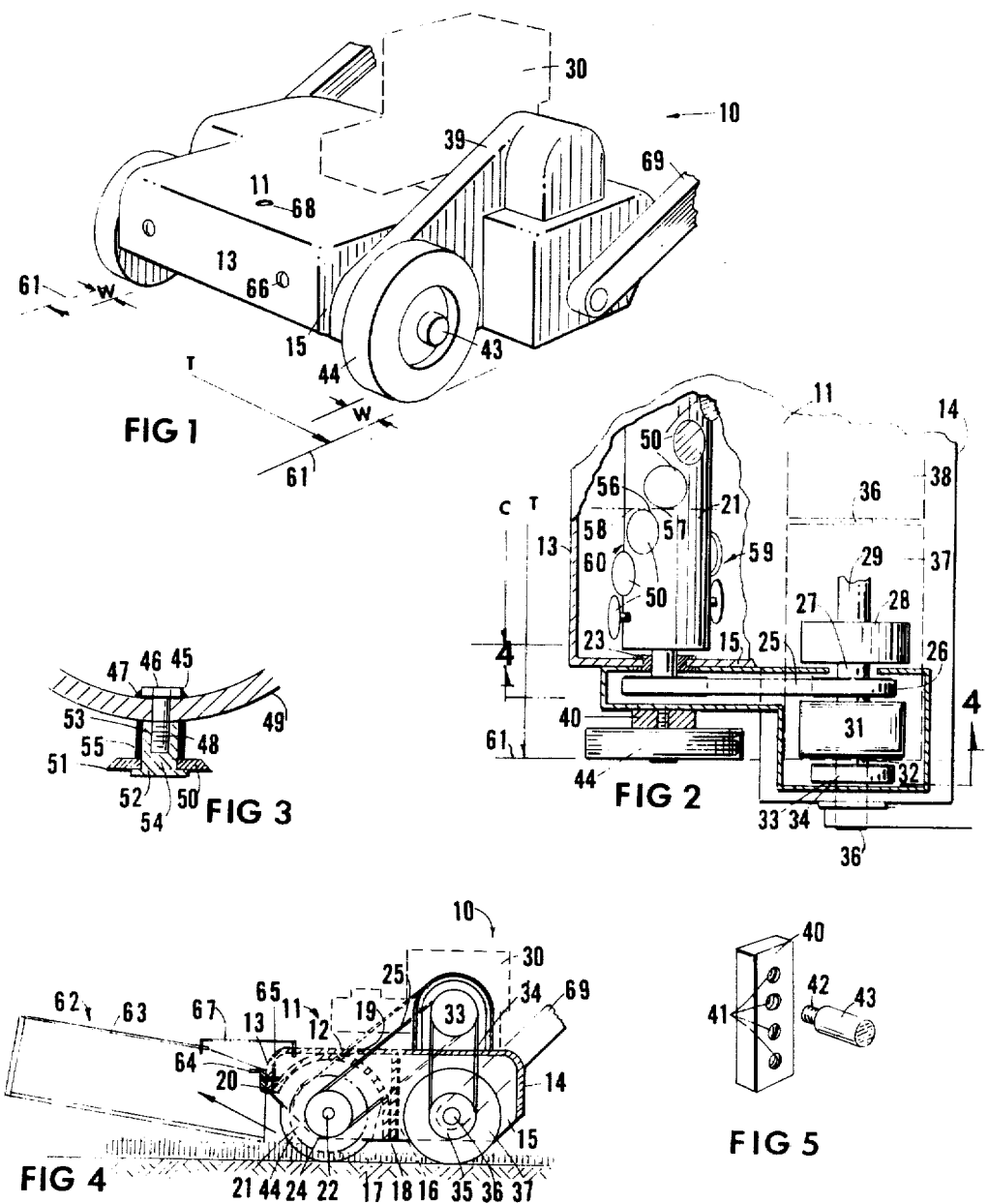
FIG. 1 is a perspective view of a mower according to the invention.
FIG. 2 is a plan view of a portion of the mower of FIG. 1 cut away to reveal drive mechanism and the nature of the flying cutter cylinder structure.
FIG. 3 is a sectional detail of a flying cutter mounted on the cylinder of FIG. 2.
FIG. 4 is a sectional elevation on the line 4—4 of FIG. 2.
FIG. 5 is a perspective view of a cylinder support roller mounting block to which a cutter cylinder support roller axle may be fastened at any selected height to adjust the height of cut.

In the drawings, the mower 10 of the invention comprises a rigid housing 11 formed of sheet metal to define a top wall 12 having a front depending flange 13 and a reared pending flange 14 extending between rigid side walls 15 and rigidified by dividing wall 16 and the curved wall 17 welded at 18 to dividing wall 16 and welded at 19 and 20 to top wall 12 and front flange 13. Cutter cylinder 21 is mounted by its shaft 22 through side walls 15 in high speed bearings 23. At the left side of the mower as shown in FIG. 2, shaft 22 extends beyond side wall 15 to mount a pulley wheel 24 connecting by drive belt 25 to drive pulley wheel 26 driven by output shaft 27 of centrifical clutch device 28 driven by shaft 29 of motor 30 shown in broken lines in FIGS. 1 and 4. Output shaft 27 also drives a conventional reversing speed reduction device 31 having reduction output shaft 32 driving pulley wheel 33 connecting by drive belt 34 to pulley 35 driving shaft 36 and the left hand roller 37 carrying on a continuation of its shaft 36 the free running roller 38.

The side walls 15 extend laterally to accommodate the rollers 37, 38 of substantially greater total width than the cylinder 21. On the left hand portion of the mower a drive belt casing 39 encloses belts 25, 34 and carries the adjustable mounting block 40 having a plurality of vertically arranged threaded holes 41 adapted to receive the threaded stud 42 of stud shaft 43 carrying height adjusting wheel 44. On the right-hand side of the mower the mounting block 40 is fastened directly to the side wall 15 and on both sides the mounting holes are located vertically in alignment with the shaft 22.

Reel cylinder 21 carries a plurality of flying cutters preferably formed in the manner indicated in FIG. 3 and comprising a mounting bolt 45 having a head 46 welded as at 47 to cylinder 21 and having the threaded shank 48 thereof extending outwardly beyond the outer surface 49 of the cylinder. A steel washer 50 having a hardened bevelled cutting edge 51 rests against the head end 52 on shank 53 of mounting stud 54 being held rigidly in assembly therewith by the exterior mounting sleeve 55. The cutters are preferably arranged at such spiral angle relative to the diameter of each that the near edges 56, 57 (FIG. 2) slightly overlap a theoretical circumferential line 58. The rate of spiral or spiral angle is such that one row of such cutters will spiral through 180° of arc only. A second row of cutters 59 is diametrically opposed from the row of cutters 60 at the same rate of spiral but the cutters are located half a cutter width axially from the cutters of the first row 60. Accordingly no more than two cutters will be in longitudinal alignment on the cylinder and thus the power requirements are substantially that necessary to operate only two cutters at any one moment at reel speeds greater than 1,000 rpm.

Removable cuttings box 62 is of light sheet metal or screen on frame 63 having cross bar 64 with mounting studs 65 seating in holes 66 in front wall 13 and is held in upward tilted position by wire hook 67 connecting to hole 68 in top wall 11.

The invention in particular requires that the total effective width and effective ground contacting path of the rear rollers 37, 38 should be greater than the cutting width of the flying cutter cylinder 21 and in any case at least as great as the total distance between the outside track lines 61 of rollers 44. In this way the roller marks or tracks from the adjusting rollers 44 are encountered by the rollers 37, 38. Especially, however, the weight of the mower including the engine 30 is located substantially over the roller shaft 36 so that very little weight is carried by adjusting rollers 44, the latter serving essentially to space the flying cutters 50 a predetermined distance from the ground surface as determined by the mounting height of stud shafts 43 in holes 41 of mounting blocks 40. Handle 69 may be of any suitable conventional structure.

From the foregoing it will be evident that the invention concerns the combination in a lawn mower of a cutter cylinder having flying cutters thereon, said cylinder being of a predetermined length: a mower supporting roller structure and means including shafts and bearings rotatably mounting said cutter cylinder and said roller structure in parallel spaced apart relationship; a drive motor including a drive connection for rotating said cutting cylinder at a cutter speed greater than 6,000 feet per minute in a direction moving the cutters of said cutter cylinder forwardly in a grass cutting action, forward adjusting rollers on said mower adjustable to support said cutter cylinder and the cutters thereof a selected predetermined distance above a ground surface, the total length of said roller structure being not less than the effective total track width of said adjusting rollers and said cutter cylinder.

The cutters become especially effective at speeds in excess of 6,000 feet per minute, the cleanest cutting action occurring at 8,000 feet per minute. The rotary speed is of the order of 100 revolutions per second or 200 cuts per second with two spiral series of cutters at an effective cutting radius of the cutters on the cylinder of 3 ½ inches.

The invention also concerns a modified form of mower 62 as seen in FIGS. 6 to 10, said mower comprising a housing 63 having associated components which, if similar to the components of the mower of FIGS. 1 to 5 are identified by the same number and need no further explanation. In this case however, the rotary cutter shaft 22 has a plurality of blower cutter discs 64 of a predetermined diameter and embodies diametrically opposed cutters 65 on one face and diametrically opposed cutters 66 on the other face thereof. Each of said faces carrying radially extending lagging blower blades 67, 68 and having associated with the mounting bore 69 thereof at least one drive lug 70 extending from each side face. Accordingly, said disc 64 may be mounted on shaft 22 and separated thereon by driving collars 72 having lug accommodating slots 73, 74 therein, said slots being separated by an arc of less than 180° and being located on opposed edges whereby the cutters of the various discs may be located along a spiral angle so that a minimum number of cutters will be active at any one moment. Pulley 21 embodies a lug (not shown) to engage in a driving slot 73 of the first driving collar 72 with which it engages.

The plural disc arrangement of FIG. 9 is rotatably mounted by its shaft 22 supported in suitable bearings in housing 63 as for example in the manner illustrated in the form of the invention shown in FIG. 2 and is surrounded by a centrifugal blower structure 75 comprising a curved forward wall 76 extending in close proximity to the edges 77 of the blower disc 74 and terminating downwardly at an intake opening edge 78 and terminating upwardly and forwardly in the blower discharge tube or pipe 79 having a forwardly and upwardly canted opening 80 defined by top wall 81 and side walls 82 and leading from the outwardly spirally curved back wall 83 to terminate downwardly and forwardly in the intake opening 84 of a predetermined lesser size than the outlet or exhaust opening 80 in its spacing from the peripheries of discs 77.

Idler roller 84 is mounted on a pivotal bracket arm 85 radially positioned by the pin seatable in the stationary sleeve (not shown) thereby to radially position said roller in selected positions from the bold line position shown in FIG. 7 to a maximum cutting height position shown in chain lines at 84a to provide a range of cutting heights between a minimum $m_1$ and a maximum $m_2$.

I claim as my invention:

1. A lawn grass mower comprising: a rigid housing, a cutter cylinder having flying cutters thereon, said cylinder being of a predetermined length, said cylinder being rotatably supported in said housing; a mower supporting roller structure for said housing; means in said housing including shafts and bearings rotatably mounting said cylinder and said roller structure in parallel spaced apart relationship; a drive motor supported by said housing and including a drive connection for rotating said cutter cylinder at a cutter speed greater than 6,000 feet per minute in a direction moving the cutters of said reel cylinder forwardly in a grass cutting action; at least one forward adjusting roller in said mower housing adjustable to support said cylinder and the cutters thereof a selected predetermined distance above a ground surface; said cutting cylinder and flying cutters being in the form of a plurality of cutter discs of predetermined diameter; each of said discs having opposed laterally extending blades on each of the side surfaces thereof; blower members on each of the side surfaces thereof; a driving collar separating each of said discs from the next in parallel spaced apart relationship along the shaft mounting said cylinder defined by said cutter discs; and a centrifugal blower housing structure extending about said cutter cylinder to define a blower inlet opening forwardly of said adjusting roller over the ground surface and defining thereabove a blower body and discharge pipe having an opening for the discharge of grass cuttings.

2. The combinations of claim 1 in which the flying cutters defining the cutter cylinder comprise a plurality of cutter discs each fastened by a driving collar in rigid predetermined spaced relation to adjacent cutter discs, said cutters of said discs being arranged in a spiral.

3. The combination of claim 1 in which the flying cutters on the cutter cylinder comprise a plurality of cutters each fastened by a mounting stud in rigid predetermined spaced relation to the outer surface of the cutter cylinder, said cutters being arranged in a plurality of spiral series each series extending from substantially one end of the cutter cylinder to the other over substantially one half the circumferential surface of the cylinder, the cutters of one series being located in substantially diametrically opposed relationship to the cutters of the other series and on a theoretical circumferential line passing between a pair of cutters of the opposed series, adjacent cutters in each series being located slightly to overlap a theoretical circumferential line extending therebetween.

4. The mower of claim 1 in which the roller structure comprises a shaft; a driven roller fixed to said shaft; a free running roller rotatable on said shaft and a drive transmission having reduction device connecting the drive motor to said shaft.

5. The mower of claim 1 and a centrifical clutch in the drive connection between said drive motor and the cutter cylinder.

* * * * *